United States Patent
Ayash et al.

(10) Patent No.: US 11,681,477 B1
(45) Date of Patent: Jun. 20, 2023

(54) AUTOMATED PRINT ENGINE SPEED CONTROL

(71) Applicant: Xerox Corporation, Norwalk, CT (US)

(72) Inventors: Barry K. Ayash, Webster, NY (US); Randy R. Sprague, Webster, NY (US); Mark A. Rule, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/574,613

(22) Filed: Jan. 13, 2022

(51) Int. Cl.
*G06F 3/12* (2006.01)

(52) U.S. Cl.
CPC ............ *G06F 3/121* (2013.01); *G06F 3/1256* (2013.01); *G06F 3/1204* (2013.01)

(58) Field of Classification Search
CPC .......... G06F 3/121; G06F 3/1256; G06F 3/12; G06F 3/1204
USPC ....................................................... 358/1.14
See application file for complete search history.

(56) References Cited

U.S. PATENT DOCUMENTS

| | | | |
|---|---|---|---|
| 5,166,610 A * | 11/1992 | Bezos | G01P 1/08 73/488 |
| 7,390,084 B2 | 6/2008 | Folkins | |
| 8,204,396 B2 | 6/2012 | Hamby et al. | |
| 9,207,893 B2 * | 12/2015 | Hasegawa | G06K 15/1823 |
| 9,517,641 B2 * | 12/2016 | Sayama | D06P 5/30 |
| 9,864,891 B2 | 1/2018 | Berggren et al. | |
| 2002/0071104 A1 * | 6/2002 | Silverbrook | B41J 2/1645 348/E5.055 |
| 2009/0179934 A1 | 7/2009 | Takagi et al. | |
| 2013/0084087 A1 | 4/2013 | Ikeda | |

\* cited by examiner

*Primary Examiner* — Darryl V Dottin
(74) *Attorney, Agent, or Firm* — Gibb IP Law Firm, LLC (57) ABSTRACT

A processor of a printing apparatus obtains and maintains the media type of print media located in a media storage component of the printing apparatus. The processor also accesses a reference file containing different printing speed limits for different media types. The reference file can be maintained in an electronic storage component of the printing apparatus. The processor uses the reference file to determine an appropriate printing speed limit for a printing engine of the printing apparatus that corresponds to the media type of the print media in the media storage component. Further, a user interface of the printing apparatus can display an overspeed indicator, and/or the processor can stop the printing from occurring, based on a job-set printing speed of the printing engine being above the printing speed limit.

17 Claims, 5 Drawing Sheets

AUTOMATED PRINT ENGINE SPEED CONTROL

BACKGROUND

Systems and methods herein generally relate to printing devices and uses thereof and more particularly to controlling the printing speed of printing devices.

Modern printing devices operate at a variety of speeds, with various tradeoffs occurring as printing speed increases. Some lower end less expensive printers only print at a single relatively slower speed. Users who desire printers that operate faster usually pay a premium for such higher-speed devices. In addition, higher speed printing devices can operate at different speeds, with print quality generally decreasing as speeds increase.

SUMMARY

Various printing apparatuses herein include (among other components) a printing engine, an electronic storage component, a media storage component, a user interface, etc., all operatively (directly or indirectly) connected to at least one processor. The processor is adapted to be manually or automatically supplied with, and maintain, the media type (e.g., denoting physical characteristics of the media) of the print media in the media storage component. The different media types can be based on the media weight, the media coating, etc.

The processor is also adapted to access a reference file containing different printing speed limits for different media types. For example, the reference file can be maintained in the electronic storage component and the reference file can contain, for example, at least three different speeds for different media types. With this, the processor is adapted to automatically determine an appropriate printing speed limit for the printing engine that corresponds to the media type of the print media in the media storage component using the reference file.

The user interface is adapted to display an overspeed indicator based on the job-set printing speed of the printing engine being above the printing speed limit and/or the processor is adapted to stop the printing from occurring based on the job-set printing speed of the printing engine being above the printing speed limit. Such an overspeed indicator can display that the job-set printing speed is above the printing speed limit. The overspeed indicator can also display various user selectable options that can include an option to run the printing engine at the job-set printing speed or an option to run the printing engine at a speed below the job-set printing speed (e.g., at the printing speed limit).

In other embodiments, the processor can be adapted to automatically reduce the speed of the printing engine from the job-set printing speed to the printing speed limit based on the job-set printing speed being above the printing speed limit. In such embodiments, the overspeed indicator displayed on the user interface can indicate that the speed of the printing engine was automatically reduced.

Various methods herein obtain and maintain (using a processor of a printing apparatus) the media type of the print media located in a media storage component of the printing apparatus. The different media types can be based on media weight, media coating, etc. These methods also access (using the processor) a reference file containing different printing speed limits for different media types. The reference file can be maintained in an electronic storage component of the printing apparatus.

Methods herein determine (using the processor) an appropriate printing speed limit for a printing engine of the printing apparatus corresponding to the media type of the print media in the media storage component using the reference file. Further, such methods can display (using a user interface of the printing apparatus) an overspeed indicator, and/or use the processor to stop the printing from occurring, based on a job-set printing speed of the printing engine being above the printing speed limit.

The process of displaying the overspeed indicator can display that the job-set printing speed is above the printing speed limit, and/or this process can display user selectable options including an option to run the printing engine at the job-set printing speed or to run the printing engine at a speed below the job-set printing speed.

In other embodiments, these methods can automatically reduce (using the processor) the speed of the printing engine from the job-set printing speed to the printing speed limit based on the job-set printing speed being above the printing speed limit. With these methods, the process of displaying the overspeed indicator can indicate that the speed of the printing engine was automatically reduced.

These and other features are described in, or are apparent from, the following detailed description.

BRIEF DESCRIPTION OF THE DRAWINGS

Various exemplary systems and methods are described in detail below, with reference to the attached drawings, in which.

DETAILED DESCRIPTION

As mentioned above, tradeoffs occur as the printing speed of printers increases. One tradeoff involves the cost of the printing machine, where faster printers are generally more expensive. Another tradeoff involves image quality, which can decrease as printing speeds increase.

In one example, as printing speeds increase the time is shortened for any liquid inks to dry and/or be absorbed into the print media. This can result in the undried or unabsorbed ink smearing or forming undesired marks, which decreases the print image quality. With printers that fuse markings onto sheets, the time allotted for such fusing processes also decreases, which can result in incomplete fusing and missed printed areas. Generally, each printer has a maximum printing speed at which prints can be produced while still retaining an image quality that is above a minimum image quality threshold.

The present inventors noted that the type of media utilized during printing also effects how quickly any specific printer can print before image quality defects exceed an allowable defect threshold. Specifically, higher weight and coated print media take longer to form a bond with the marking material where, for example, heavier and/or glossy print media can take a longer time to adsorb liquid inks which reduces the speed at which printing can occur while still maintaining a minimum image quality standard (when compared to lighter weight non-glossy media).

In view of these issues, the systems and methods herein automatically determine a printing speed limit for each printer based upon the printer's capabilities and on the type of print media that will be utilized. Thus, depending upon the type of print media utilized, the printing speed limit may be increased or decreased automatically by the printing apparatus, all while keeping image quality above a minimum image quality threshold.

As noted above, some printing devices have adjustable printing speeds. This allows the user to choose the printing speed. However, often users choose a printing speed that is too fast to maintain printing above the minimum image quality threshold. In view of this, the methods and systems herein determine a printing speed limit for each printer based upon the printer's capabilities and on the type of print media that will be utilized. The systems and methods herein can produce a warning that the user-selected printing speed is too high, can stop printing, or can automatically decrease the printing speed if the user-selected printing speed is above the printer-determined printing speed limit. This helps save time and money, and minimize waste by not allowing printing jobs to run at the wrong print speed.

Figure 1:
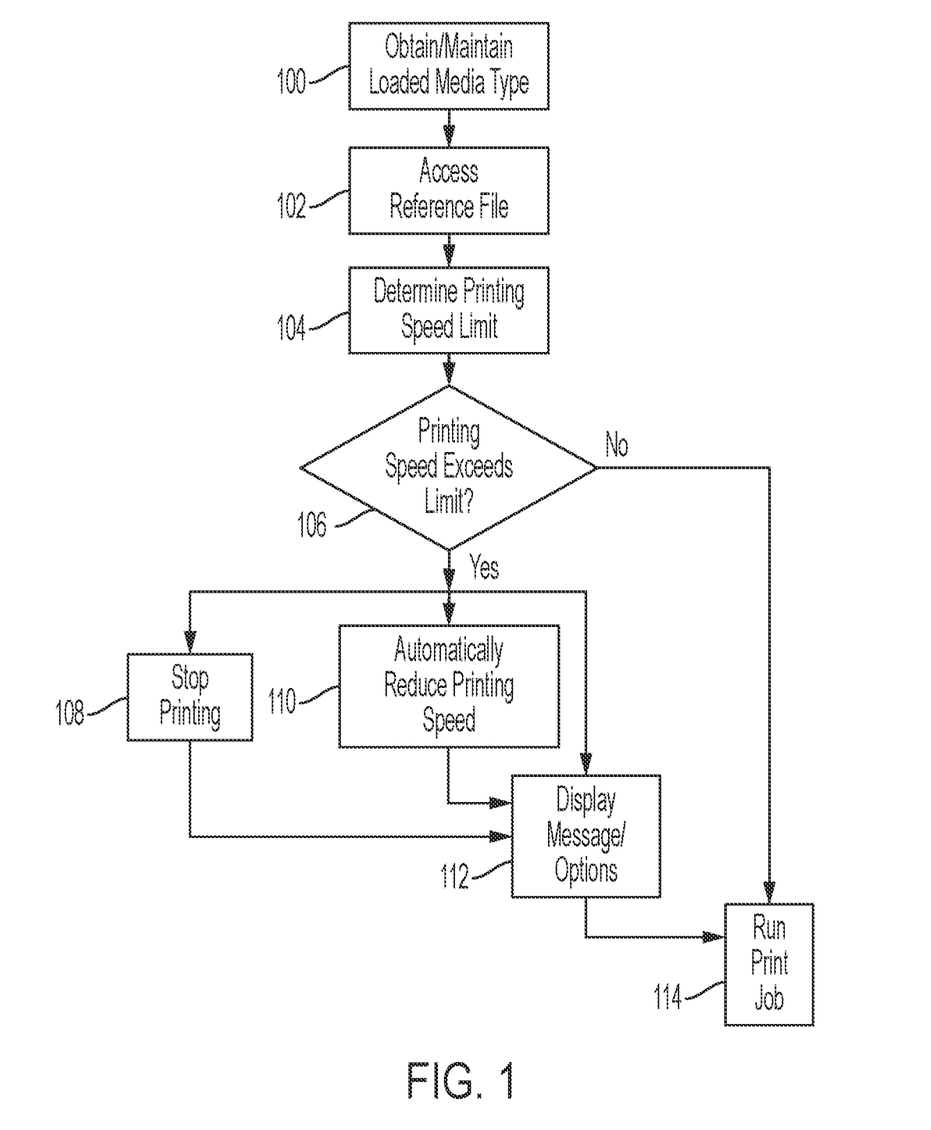
FIG. 1 is a flow diagram of various methods herein.

FIG. 1 is a flowchart illustrating exemplary methods herein. In item 100, these methods obtain and maintain (using a processor of a printing apparatus) the media type of the print media loaded in a media storage component of the printing apparatus. The different media types can be based on media weight, media coating, etc. For example, when paper or other print media is loaded into the print tray(s) of the printer, the person loading the print media can enter (into fields provided on the user interface) what type of print media is being loaded, or the printer can automatically determine what type of print media was loaded using sensors, scanners, etc. Therefore, the printer 304 obtains and maintains (using a processor and memory) the media type of print media located in the media storage component (e.g., paper tray) of the printing apparatus.

As shown in item 102, these methods also access (using the processor) a reference file containing different printing speed limits for different media types. The reference file can be maintained in an electronic storage component of the printing apparatus or in other computerized devices, such as network connected computer servers, etc.

Accessing the reference file in item 102 permits methods herein to determine (using the processor) an appropriate printing speed limit for the printing engine of the printing apparatus, as shown in item 104. Specifically, in item 104, the processor retrieves, from the reference file, a printer-specific printing speed limit that corresponds to the media type of the print media in the media storage component that is to be used for the print job.

As shown in item 106, these methods determine whether the job-set printing speed exceeds the printing speed limit determined in item 104. If the job-set printing speed does not exceed the printing speed limit, processing flows to item 114 where the print job proceeds without alteration.

However, as shown in item 108, such methods can stop the printing from occurring, based on the job-set printing speed of the printing engine being above the printing speed limit determined in item 106. In other embodiments, as shown in item 110 these methods can automatically reduce (using the processor) the speed of the printing engine from the job-set printing speed to the printing speed limit based on the job-set printing speed being above the printing speed limit in item 106.

In addition to the foregoing steps or as an alternative thereto, in item 112 these methods can display (using a user interface of the printing apparatus) a warning or overspeed indicator that the job-set printing speed of the printing engine being above the printing speed limit in item 106 while still proceeding to run the print job at the unadjusted job-set printing speed, as shown in item 114. In this example, the process of displaying the overspeed indicator in item 112 can display text on the user interface of the printing apparatus that the job-set printing speed is above the printing speed limit.

As another option, in item 112 the processing can display user selectable options on the user interface of the printing apparatus. One such menu option is an option to run the printing engine at the job-set printing speed even if it exceeds the printing speed limit. This may result in printing quality that is below the allowable quality; however, such may be acceptable to the user if the user values speed over quality. Another menu option is to run the printing engine at a speed below the job-set printing speed, which could reduce the job-set printing speed closer to the printing speed limit, reduce the job-set printing speed to the printing speed limit, or reduce the job-set printing speed to a speed below the printing speed limit. If either of these options are selected, processing can proceed to item 114 where the print job is run at the unaltered job-set printing speed, or a reduced speed, depending upon the options selected by the user.

Also, if the printing engine is stopped in item 108, these methods can display a warning overspeed indicator that the printing engine was stopped because the job-set printing speed of the printing engine is above the printing speed limit. This allows the user to manually adjust the job-set printing speed if desired.

Further, if the engine speed is automatically reduced in item 110, the process of displaying the overspeed indicator in item 112 can display text that the speed of the printing engine was automatically reduced while proceeding to run the print job at the automatically reduced job-set printing speed as shown in item 114.

Figure 2:
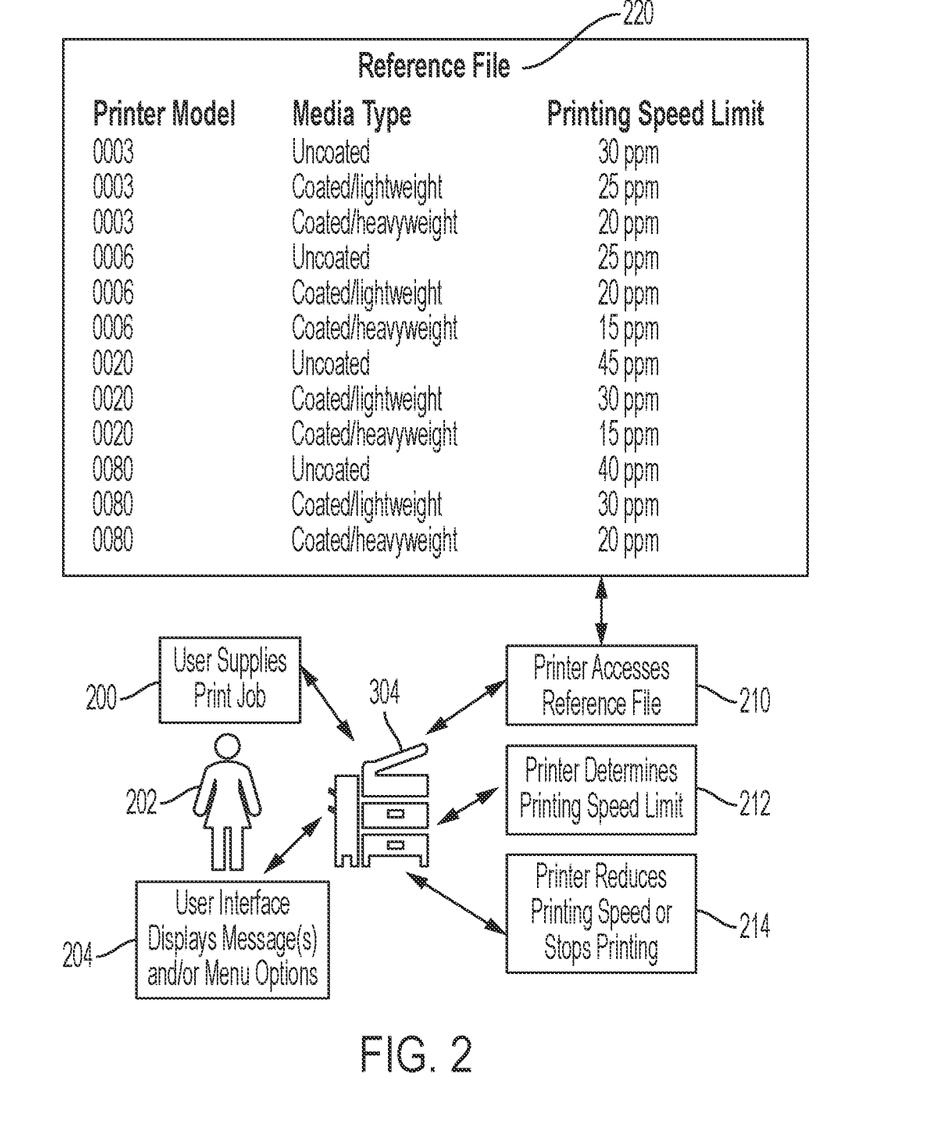
FIG. 2 is a conceptual diagram showing operations of methods and devices herein.

FIG. 2 is a conceptual diagram showing that a user 202 can supply a print job to a printer 304 (or printer system) in item 200. This print job 200 can specify the printing speed (e.g., in sheets per minute or some other measure, such as high, medium, low, etc.) and the media type to be used for the print job.

When paper or other print media is loaded into the print tray(s) of the printer 304, the one loading the print media can specify what type of print media is being loaded or the printer 304 can automatically determine what type of print media was loaded. Therefore, the printer 304 obtains and maintains (using a processor of a printing apparatus 304) the media type of the print media located in a media storage component of the printing apparatus. The different media types can be based on media weight, media coating, etc.

As shown in item 210, potentially in response to the user supplying the print job 200 or in response to the user loading print media, the processor of the printing apparatus 304 can access the reference file 220. As noted above, the reference file 220 contains printer-specific printing speed limits for different media types. The reference file 220 can be automatically or manually prepared previously based on empirical testing and/or modeling. As can be seen in the non-limiting example of a reference file 220 shown in FIG. 2, different printer models (e.g., 0003, 0006, 0020, 0080, etc.)

can each print with different media types (e.g., uncoated media, coated lightweight media, coated heavyweight media, etc.). Thus, different printer models may show different print quality decreases as speeds increase, and this change in image quality is further affected by media type.

The reference file 220 shown in FIG. 2 shows that different combinations of printer model and media type may result in different printing speed limits (e.g., 10 pages per minute (ppm) to 45 ppm in the example shown). The reference file 220 can be maintained in an electronic storage component of the printing apparatus 304 or can be maintained at a remote location (e.g., a remote server, etc.) that the printing apparatus 304 has access to.

By accessing the reference file 220, in item 212 the printing apparatus 304 determines (using the processor) an appropriate printing speed limit for the printing engine of the printing apparatus that corresponds to the media type of the print media in the media storage component using the reference file 220. For example, the printer uses the combination of corresponding printer model and media type to locate the printing speed limit within the reference file 220.

As shown in item 214, the printing apparatus 304 (using the processor) can stop the printing from occurring if the job-set printing speed of the printing engine is above the printing speed limit. As another alternative, in item 214 the printing apparatus 304 (using the processor) can automatically reduce (using the processor) the speed of the printing engine from the job-set printing speed to the printing speed limit if the job-set printing speed is above the printing speed limit.

Further, as shown in item 204 such methods can display (using a user interface of the printing apparatus) an overspeed indicator that the job-set printing speed of the printing engine is above the printing speed limit and possibly that the printing engine was stopped because of this situation. In item 204, the user interface can further display user selectable options including an option to run the printing engine at the job-set printing speed or to run the printing engine at a speed below the job-set printing speed. Also, item 204 can display that the speed of the printing engine was automatically reduced if that action occurred in item 214.

Figure 3:
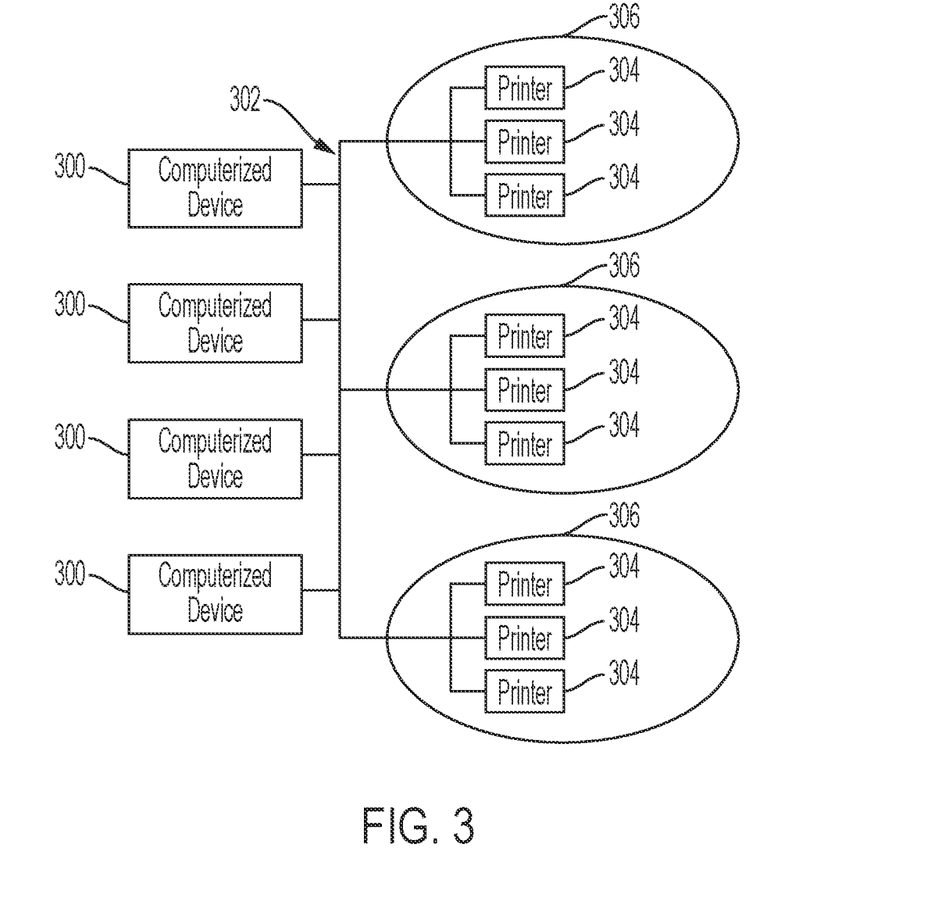
FIG. 3 is a schematic diagram illustrating systems herein.

As shown in FIG. 3, exemplary systems and methods herein include various computerized devices 300, 304 located at various different physical locations 306. The computerized devices 300, 304 can include print servers, printing devices, personal computers, etc., and are in communication (operatively connected to one another) by way of a local or wide area (wired or wireless) network 302.

Figure 4:
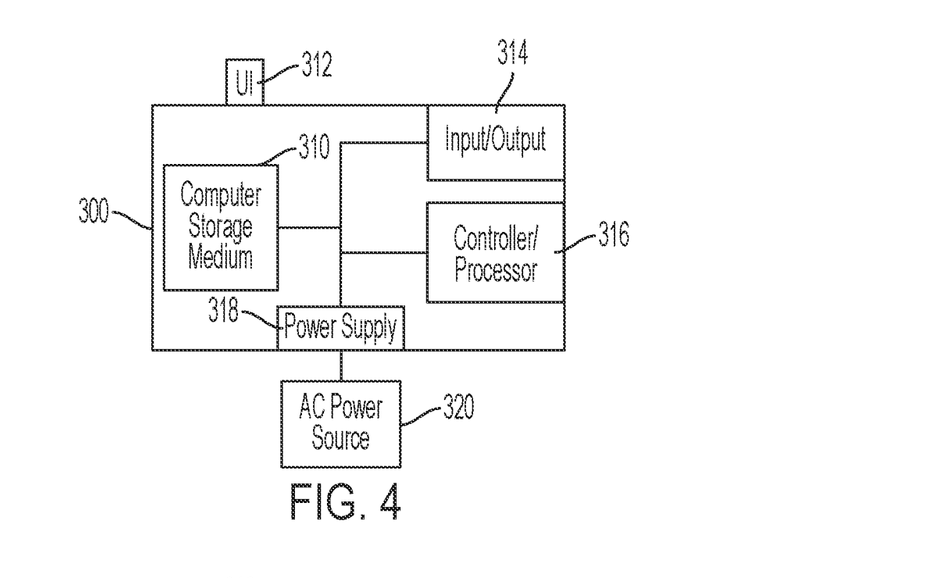
FIG. 4 is a schematic diagram illustrating devices herein.

FIG. 4 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a user interface (UI) assembly 312. The user may receive overspeed indicators, instructions, and menu options from, and enter instructions through, the user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 4, a body housing has one or more functional components that operate on power supplied from an alternating current (AC) source 320 by the power supply 318. The power supply 318 can comprise a common power conversion unit, power storage element (e.g., a battery, etc), etc.

Figure 5:
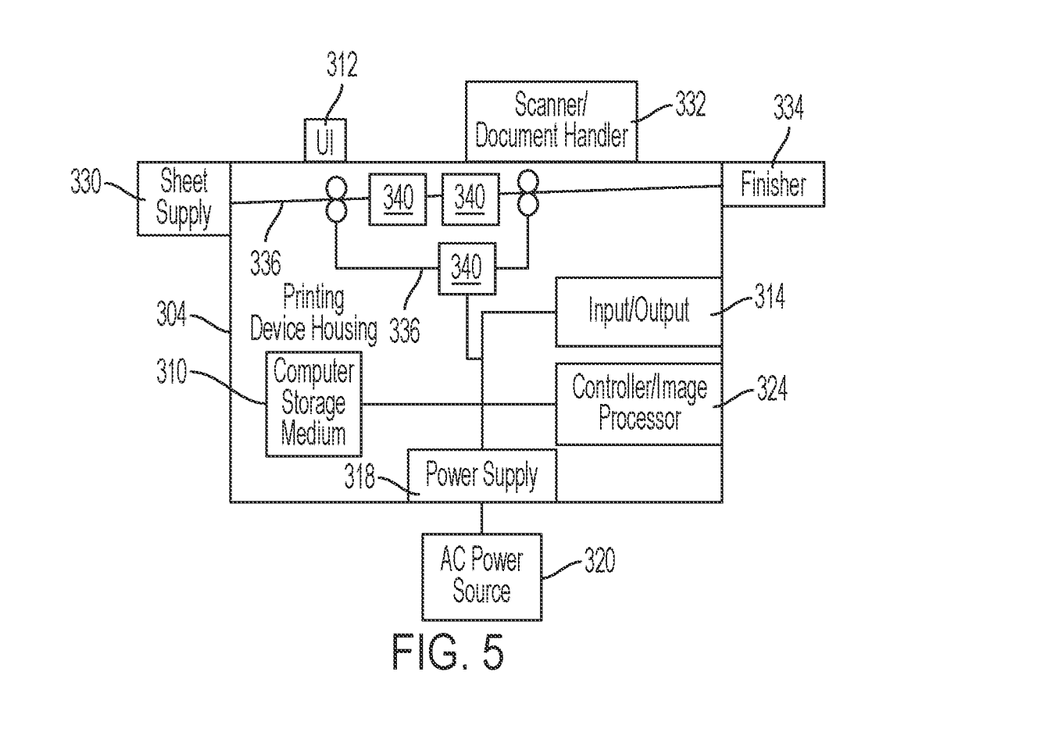
FIG. 5 is a schematic diagram illustrating devices herein.

FIG. 5 illustrates a computerized device that is a printing device 304, which can be used with systems and methods herein and can comprise, for example, a printer, copier, multi-function machine, multi-function device (MFD), etc. The printing device 304 includes many of the components mentioned above and at least one marking device (printing engine(s)) 340 operatively connected to a specialized image processor 324 (that may be different from a general purpose computer because it is specialized for processing image data), a media path 336 positioned to supply continuous media or sheets of media from a sheet supply 330 to the marking device(s) 340, etc. After receiving various markings from the printing engine(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 320 (through the power supply 318).

Thus, various printing apparatuses herein include (among other components) a printing engine 340, an electronic storage component 310, a media storage component 330, a user interface 312, etc., all operatively (directly or indirectly) connected to at least one processor 324. The processor 324 is adapted to be manually or automatically supplied with, and maintain, the media type (e.g., denoting physical characteristics of the media) of the print media in the media storage component 330. The different media types can be based on the media weight, the media coating, etc.

The processor 324 is also adapted to access the reference file containing different engine 340 speed limits for different media types. For example, the reference file can be maintained in the electronic storage component 310 and the reference file can contain, for example, at least three different speeds for different media types. With this, the processor 324 is adapted to automatically determine an appropriate engine 340 speed limit for the printing engine 340 that corresponds to the media type of the print media in the media storage component 330 using the reference file.

The user interface 312 is adapted to display an overspeed indicator based on the current engine 340 speed of the printing engine 340 being above the engine 340 speed limit and/or the processor 324 is adapted to stop the printing engine 340 from operating based on the current engine 340 speed of the printing engine 340 being above the engine 340 speed limit. Such an overspeed indicator can display that the current engine 340 speed is above the engine 340 speed limit. The overspeed indicator can also display various user selectable options that can include an option to run the printing engine 340 at the current engine 340 speed or an option to run the printing engine 340 at a speed below the current engine 340 speed (e.g., at or below the engine 340 speed limit).

In other embodiments, the processor 324 can be adapted to automatically reduce the speed of the printing engine 340 from the current engine 340 speed to the engine 340 speed limit based on the current engine 340 speed being above the engine 340 speed limit. In such embodiments, the overspeed indicator displayed on the user interface 312 can indicate that the speed of the printing engine 340 was automatically reduced.

Figure 6:
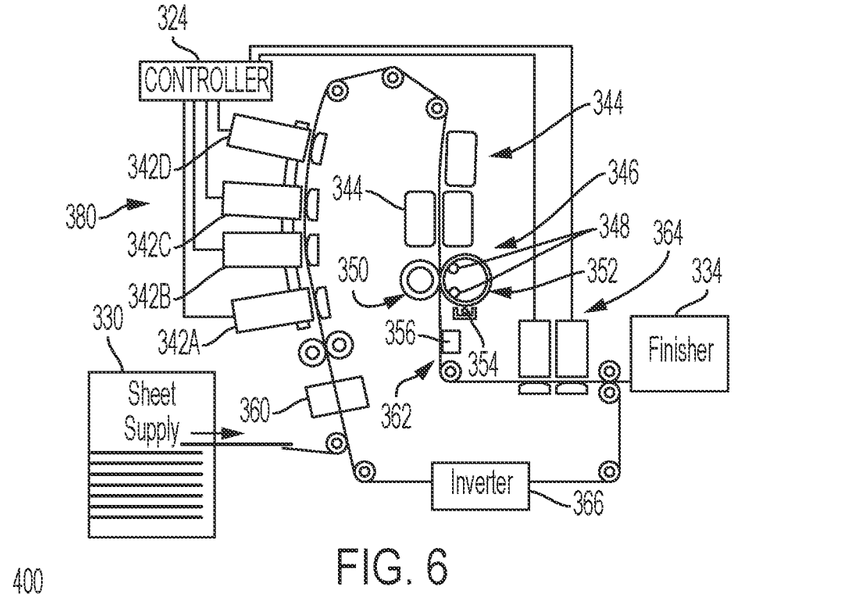
FIG. 6 is a schematic diagram illustrating devices herein.
Figure 7:
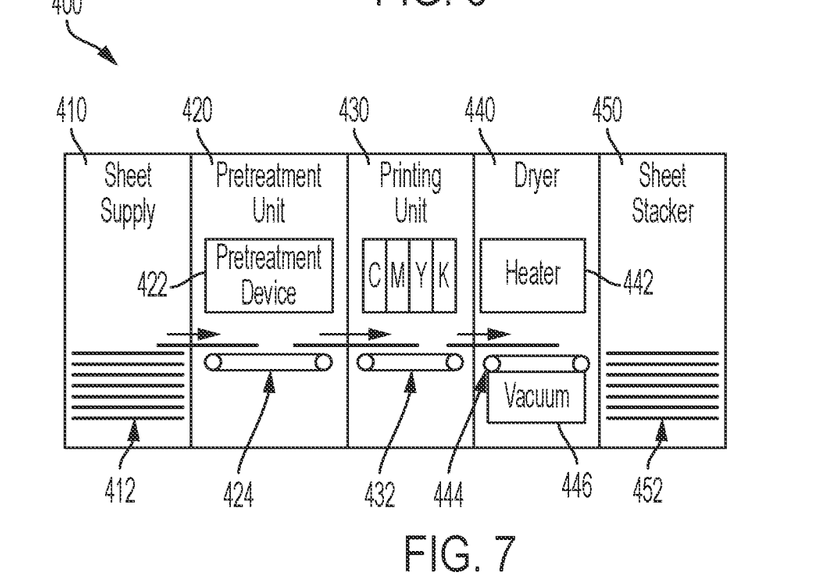
FIG. 7 is a schematic diagram illustrating devices herein.

The one or more printing engines 340 are intended to illustrate any marking device that applies a marking material (toner, inks, etc.) to continuous media or sheets of media, whether currently known or developed in the future and can include, for example, devices that use an ink jet imaging system, as shown in FIG. 6, or a high-speed aqueous imaging system, as shown in FIG. 7.

More specifically, FIG. 6 illustrates one example of the above-mentioned printing engine(s) 380 that is an ink jet imaging system. In this example, the imaging apparatus 380 is in the form of an ink jet printer that employs one or more ink jet printheads, each with an associated solid or liquid ink supply (342A-342D). The exemplary direct-to-sheet phase-change ink jet imaging system 380 includes a media supply and handling system 330 configured to supply media (e.g., paper, plastic, or other printable material). A media conditioner 360, printed sheet conditioner 344, coating station 364, and finisher 334.

The media is propelled by a sheet transport 362 that can include a variety of motors rotating one or more rollers. For duplex operations, an inverter 366 may be used to flip the sheet over to present a second side of the media to the printheads 342A-342D.

The media conditioner 360 includes, for example, a pre-heater. The pre-heater brings the media to an initial predetermined temperature that is selected for desired image characteristics corresponding to the type of media being printed as well as the type, colors, and number of inks being used. The pre-heater may use contact, radiant, conductive, or convective heat to bring the media to a target preheat temperature.

The media is transported through a printing station that includes a series of color printheads 342A-342D, each color unit effectively extending across the width of the media and being able to place ink directly (i.e., without use of an intermediate or offset member) onto the moving media. As is generally familiar, each of the printheads may eject a single color of ink, one for each of the colors typically used in color printing, namely, cyan, magenta, yellow, and black (CMYK). A controller 324 generates timing signals for actuating the ink jet ejectors in the printheads 342A-342D in synchronization with the passage of the media to enable the four colors to be ejected with a reliable degree of accuracy for registration of the differently colored patterns to form four primary-color images on the media. The ink jet ejectors are actuated by the firing signals to correspond to image data processed by the controller 324 that may be transmitted to the printer, generated by a scanner (not shown) that is a component of the printer, or otherwise generated and delivered to the printer. In various possible embodiments, a color unit for each primary color may include one or more printheads; multiple printheads in a color unit may be formed into a single row or multiple row array; printheads of a multiple row array may be staggered; a printhead may print more than one color; or the printheads or portions of a color unit may be mounted movably in a direction transverse to the process direction, such as for spot-color applications and the like.

Each of color printheads 342A-342D may include at least one actuator configured to adjust the printheads in each of the printhead modules in the cross-process direction across the media web. In a typical embodiment, each motor is an electromechanical device such as a stepper motor or the like. In a practical embodiment, a print bar actuator is connected to a print bar containing two or more printheads and is configured to reposition the print bar by sliding the print bar along the cross-process axis of the media web. In alternative embodiments, an actuator system may be used that does not physically move the printheads, but redirects the image data to different ejectors in each head to change head position.

The printer may use liquid ink or "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. As used herein, liquid ink refers to melted solid or liquid ink, heated gel ink, or other known forms of ink, such as aqueous inks, ink emulsions, ink suspensions, ink solutions, or the like.

Associated with each color unit is a backing member, typically in the form of a bar or roll, which is arranged substantially opposite the color unit on the back side of the media. Each backing member is used to position the media at a predetermined distance from the printheads opposite the backing member. Each backing member may be configured to emit thermal energy to heat the media to a predetermined temperature.

Following the printing zone along the media path are one or more "mid-heaters" 344. A mid-heater 344 may use contact, radiant, conductive, and/or convective heat to control a temperature of the media and particularly to bring the media to a temperature suitable for desired properties when passing through the spreader 346. A fixing assembly in the form of the "spreader" 346 is configured to apply heat and/or pressure to the media to fix the images to the media. The function of the spreader 346 is to take what are essentially droplets, strings of droplets, or lines of ink on the sheet and smear them out by pressure and, in some systems, heat, so that spaces between adjacent drops are filled and image solids become uniform. The spreader 346 may include rollers, such as image-side roller 352 and pressure roller 350, to apply heat and pressure to the media, either of which can include heating elements, such as heating elements 348, to bring the media to a predetermined temperature. The spreader 346 may also include a cleaning/oiling station 354 associated with image-side roller 352. The station 354 cleans and/or applies a layer of some release agent or other material to the roller surface. A coating station 364 applies a clear ink to the printed media to modify the gloss and/or to help protect the printed media from smearing or other environmental degradation following removal from the printer.

Operation and control of the various subsystems, components and functions of the imaging system are performed with the aid of the controller 324. The controller 324 may be implemented with general or specialized programmable processors that execute programmed instructions. The controller 324 may be operatively coupled to the print bar and printhead actuators of color printheads 342A-342D in order to adjust the position of the print bars and printheads along the cross-process axis of the media web. In particular, the controller may be operable to shift one or more, or all, of the color units laterally or transverse to the process direction.

The imaging system may also include an optical imaging system 356 that is configured in a manner similar to that for creating the image to be transferred to the web. The optical imaging system is configured to detect, for example, the presence, intensity, and/or location of ink drops jetted onto the receiving member by the ink jets of the printhead assembly. The imaging system may incorporate a variety of light sources capable of illuminating the printed web sufficient to detect printing errors that may be attributable to a faulty or defective ink jet or printhead. The imaging system 356 further includes an array of light detectors or optical sensors that sense the image reflected from the printed web prior to discharge. The controller 324 analyzes the information from the imaging system 356 to determine, among other things, whether a failure or an ink jet or printhead has occurred. The location of the defective printing element is identified and made available to the maintenance technician during a diagnosis procedure. The controller 324 may also use the data obtained from the imaging system 356 to adjust the registration of the color units such as by moving a color unit or one or more printheads. This image data may also be used for color control.

FIG. 7 illustrates an inkjet or aqueous ink printer system 400 that is one of the printers 304, discussed above. Specifically, FIG. 7 illustrates a high-speed ink jet or aqueous ink image producing machine or printer 400. The printer 400 includes a media supply 410, a pretreatment unit 420, a printing unit 430, a dryer 440, and a sheet stacker 450. The media supply 410 stores a plurality of media sheets 412 for printing by the printer 400.

The pretreatment unit 420 includes at least one pretreatment device 422 and transport belt 424. The pretreatment unit 420 receives the media sheets from the media supply 410 and transports the media sheets in a process direction (block arrows in FIG. 7) through the pretreatment unit 420. The pretreatment device 422 conditions the media sheets and prepares the media sheets for printing in the printing unit 430. The pretreatment unit 420 may include, for example, a coating device that applies a coating to the media sheets, a drying device that dries the media sheets, and/or a heating device that heats the media sheets to a predetermined temperature. In some embodiments, the printer 400 does not include a pretreatment unit 420 and media sheets are fed directly from the media supply 410 to the printing unit 430. In other embodiments, the printer 400 may include more than one pretreatment unit.

The printing unit 430 includes at least one marking unit transport belt 432 that receives the media sheets from the pretreatment unit 420 or the media supply 410 and transports the media sheets through the printing unit 430. The printing unit 430 further includes at least one printhead (labeled CMYK in FIG. 7 to represent the standard cyan, magenta, yellow, and black color printheads; however any color printheads could be used). The printhead (CMYK) ejects aqueous ink onto the media sheets as the media sheets are transported through the printing unit 430. In the illustrated embodiment, the printing unit 430 includes four printheads (CMYK), each of which ejects one of cyan, magenta, yellow, and black ink onto the media sheets. The reader should appreciate, however, that other embodiments include other printhead arrangements, which may include more or fewer printheads, arrays of printheads, etc.

The dryer 440 includes a heater 442 and a vacuum drying belt 444 that receives the media sheets from the printing unit 430. A vacuum plenum 446 connects to a vacuum blower or the plumbing that is connected to a vacuum blower at one side in the cross-process direction. The sheet stacker 450 receives and stacks the printed sheets 452.

While FIGS. 6 and 7 illustrate four marking stations 342, 350 adjacent or in contact with a rotating belt (348, 360), which is useful with systems that mark in four different colors such as, red, green, blue (RGB), and black; or cyan, magenta, yellow, and black (CMYK), as would be understood by those ordinarily skilled in the art, such devices could use a single marking station (e.g., black) or could use any number of marking stations (e.g., 2, 3, 5, 8, 11, etc.).

The print media is then transported by the sheet output transport 336 to output trays or a multi-function finishing station 334 performing different desired actions, such as stapling, hole-punching and C or Z-folding, a modular booklet maker, etc., although those ordinarily skilled in the art would understand that the finisher/output tray 334 could comprise any functional unit.

As would be understood by those ordinarily skilled in the art, the printing devices shown here are only examples and the systems and methods herein are equally applicable to other types of printing devices that may include fewer components or more components. For example, while a limited number of printing engines and paper paths are illustrated, those ordinarily skilled in the art would understand that many more paper paths and additional printing engines could be included within any printing device used with systems and methods herein.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing apparatus comprising:
a processor,
a printing engine operatively connected to the processor;
a media storage component operatively connected to the processor; and
a user interface operatively connected to the processor,
wherein the processor is adapted to maintain a media type of print media in the media storage component,
wherein the processor is adapted to access a reference file containing different printing speed limits for different media types,
wherein the processor is adapted to determine a printing speed limit for the printing engine corresponding to the media type of the print media in the media storage component using the reference file,
wherein the user interface is adapted to display an overspeed indicator based on a job-set printing speed of the printing engine being above the printing speed limit,
wherein the overspeed indicator displays that the job-set printing speed is above the printing speed limit and the overspeed indicator displays user selectable options including:
run the printing engine at the job-set printing speed; and
run the printing engine at a speed below the job-set printing speed.

2. The printing apparatus according to claim 1, wherein the processor is adapted to automatically reduce a speed of the printing engine from the job-set printing speed to the printing speed limit based on the job-set printing speed being above the printing speed limit.

3. The printing apparatus according to claim 2, wherein the overspeed indicator indicates that the speed of the printing engine was automatically reduced.

4. The printing apparatus according to claim 1, wherein the different media types are based on media weight, media coating, etc.

5. The printing apparatus according to claim 1, further comprising an electronic storage component operatively connected to the processor, wherein the reference file is maintained in the electronic storage component.

6. The printing apparatus according to claim 1, wherein the different printing speed limits includes at least three different speeds.

7. A printing apparatus comprising:
a processor,
a printing engine operatively connected to the processor;
a media storage component operatively connected to the processor; and
a user interface operatively connected to the processor,
wherein the processor is adapted to maintain a media type of print media in the media storage component,
wherein the processor is adapted to access a reference file containing different printing speed limits for different media types,
wherein the processor is adapted to determine a printing speed limit for the printing engine corresponding to the media type of the print media in the media storage component using the reference file,
wherein the processor is adapted to stop the printing from occurring based on a job-set printing speed of the printing engine being above the printing speed limit,
wherein the user interface is adapted to display an overspeed indicator based on the job-set printing speed of the printing engine being above the printing speed limit, and
wherein the overspeed indicator displays that the job-set printing speed is above the printing speed limit and the overspeed indicator displays user selectable options including:
run the printing engine at the job-set printing speed; and
run the printing engine at a speed below the job-set printing speed.

8. The printing apparatus according to claim 7, wherein the processor is adapted to automatically reduce a speed of the printing engine from the job-set printing speed to the printing speed limit based on the job-set printing speed being above the printing speed limit.

9. The printing apparatus according to claim 8, wherein the overspeed indicator indicates that the speed of the printing engine was automatically reduced.

10. The printing apparatus according to claim 7, wherein the different media types are based on media weight, media coating, etc.

11. The printing apparatus according to claim 7, further comprising an electronic storage component operatively connected to the processor, wherein the reference file is maintained in the electronic storage component.

12. The printing apparatus according to claim 7, wherein the different printing speed limits includes at least three different speeds.

13. A method comprising:
maintaining, by a processor of a printing apparatus, a media type of print media in a media storage component of the printing apparatus;
accessing, by the processor, a reference file containing different printing speed limits for different media types;
determining, by the processor, a printing speed limit for a printing engine of the printing apparatus corresponding to the media type of the print media in the media storage component using the reference file; and
displaying, by a user interface of the printing apparatus, an overspeed indicator based on a job-set printing speed of the printing engine being above the printing speed limit,
wherein the displaying the overspeed indicator displays that the job-set printing speed is above the printing speed limit and the displaying the overspeed indicator displays user selectable options including:
run the printing engine at the job-set printing speed; and
run the printing engine at a speed below the job-set printing speed.

14. The method according to claim 13, further comprising automatically changing, by the processor, a speed of the printing engine from the job-set printing speed to the printing speed limit based on the job-set printing speed being above the printing speed limit.

15. The method according to claim 14, wherein the displaying the overspeed indicator indicates that the speed of the printing engine was automatically reduced.

16. The method according to claim 13, wherein the different media types are based on media weight, media coating, etc.

17. The method according to claim 13, further comprising maintaining, by an electronic storage component of the printing apparatus, the reference file.

* * * * *